US012793052B2

(12) United States Patent
Mazarim Fernandes

(10) Patent No.: US 12,793,052 B2
(45) Date of Patent: Nov. 10, 2026

(54) METHOD FOR SECURING SENSITIVE DATA

(71) Applicant: OBeP Payments, LLC, San Carlos, CA (US)

(72) Inventor: Ezio Anselmo Mazarim Fernandes, Redwood City, CA (US)

(73) Assignee: OBeP Payments, LLC, San Carlos, CA (US)

( * ) Notice: Subject to any disclaimer, the term of this patent is extended or adjusted under 35 U.S.C. 154(b) by 0 days.

(21) Appl. No.: 19/557,028

(22) Filed: Mar. 4, 2026

(65) Prior Publication Data

US 2026/0195743 A1 Jul. 9, 2026

Related U.S. Application Data

(63) Continuation of application No. 18/825,333, filed on Sep. 5, 2024, now Pat. No. 12,572,929, which is a (Continued)

(51) Int. Cl.
*G06Q 20/38* (2012.01)
*G06Q 20/02* (2012.01)
(Continued)

(52) U.S. Cl.
CPC ......... *G06Q 20/3823* (2013.01); *G06Q 20/12* (2013.01); *G06Q 20/382* (2013.01);
(Continued)

(58) Field of Classification Search
CPC .... G06Q 20/023; G06Q 20/12; G06Q 20/382; G06Q 20/3823; G06Q 20/385; G06Q 20/40975
(Continued)

(56) References Cited

U.S. PATENT DOCUMENTS 12,106,289 B2 10/2024 Mazarim Fernandes
12,572,929 B2 3/2026 Mazarim
(Continued)

OTHER PUBLICATIONS

White, Ron; "How Computers Work", Illustrated by Timothy Edward Downs, 7th Edition, Oct. 15, 2003.
(Continued)

*Primary Examiner* — Wodajo Getachew
(74) *Attorney, Agent, or Firm* — Polsinelli LLP

(57) ABSTRACT

A transaction system avoids the storage of any single information item that can be used to provide access to sensitive information. To gain access to the sensitive information, information elements from at least two different databases must be provided, none of the information elements being sufficient to gain access to the sensitive information. In an example embodiment, a payment company encrypts the sensitive information, then partitions the encrypted information into at least two parts. These at least two parts are stored in at least two databases, each database being controlled by a different entity. To gain access to the sensitive information, each of the different entities must provide their part of the encrypted information. Absent any one of the parts of the encrypted information, it is virtually impossible to access the sensitive information.

17 Claims, 4 Drawing Sheets

Related U.S. Application Data continuation of application No. 14/341,776, filed on Jul. 26, 2014, now Pat. No. 12,106,289.

(60) Provisional application No. 61/930,433, filed on Jan. 22, 2014.

(51) Int. Cl.
*G06Q 20/12* (2012.01)
*G06Q 20/40* (2012.01)

(52) U.S. Cl.
CPC ..... *G06Q 20/385* (2013.01); *G06Q 20/40975* (2013.01); *G06Q 20/023* (2013.01)

(58) Field of Classification Search
USPC .............................................................. 705/65
See application file for complete search history.

(56) References Cited

U.S. PATENT DOCUMENTS

| | | | | |
|---|---|---|---|---|
| 2002/0049914 | A1* | 4/2002 | Inoue | G06F 21/31 726/6 |
| 2006/0005033 | A1 | 1/2006 | Wood | |
| 2008/0109279 | A1 | 5/2008 | Csoka | |
| 2008/0208697 | A1* | 8/2008 | Kargman | G06Q 30/06 705/17 |
| 2010/0274634 | A1 | 10/2010 | Ifrah | |
| 2011/0238578 | A1* | 9/2011 | Hurry | G07F 7/08 705/65 |
| 2013/0054462 | A1* | 2/2013 | Sproles | G06Q 20/40 705/35 |
| 2013/0145173 | A1* | 6/2013 | Shablygin | G06F 21/34 713/185 |
| 2013/0275308 | A1* | 10/2013 | Paraskeva | G06Q 20/3224 705/44 |
| 2013/0278622 | A1* | 10/2013 | Sun | G06K 7/10 345/589 |
| 2013/0297516 | A1 | 11/2013 | Mampaey | |
| 2015/0206137 | A1 | 7/2015 | Mazarim Fernandes | |
| 2025/0061447 | A1 | 2/2025 | Mazarim Fernandes | |

OTHER PUBLICATIONS

U.S. Appl. No. 14/341,776, Office Action dated Sep. 5, 2017.
U.S. Appl. No. 14/341,776, Final Office Action dated Jun. 14, 2018.
U.S. Appl. No. 14/341,776, Office Action dated Oct. 7, 2020.
U.S. Appl. No. 14/341,776, Final Office Action dated Aug. 3, 2021.
U.S. Appl. No. 14/341,776, Office Action dated Apr. 20, 2022.
U.S. Appl. No. 14/341,776, Final Office Action dated Feb. 9, 2023.
U.S. Appl. No. 14/341,776, Office Action dated Jun. 28, 2023.
U.S. Appl. No. 14/341,776, Final Office Action dated Nov. 29, 2023.

* cited by examiner

<u>The process to create the different pieces from the sensitive data is described on the steps bellow:</u>

1) Sensitive data (SD) is encrypted using a standard encryption algorithm like AES with a key K1 producing encrypted data (ED)

```
[N][Y][C][C][N] -- Encrypt (AES with key K1) --> [A][1][X][&][$][R]
          ^                                                 ^
          |                                                 |
          +- SD - Sensitive Data                            +- ED - Encrypted Data
```

2) The resulting encrypted data is split into 2 or more pieces in a way that every single piece alone cannot be used to reconstruct the original sensitive data even when knowing the value of the encryption key. A random token [TK] is generated to reference the original sensitive data.

```
[A][1][X][&][#][R] -- Split -->  [J][x][9]    ,    [F][b][W]        , ... , [J][x][m]
    ^                                ^                ^                        ^
    |                                |                |                        |
    +- SD - Encrypted Data           +- P1 - Piece 1  + P2 - Piece 2           + Pn - Piece N
```

3) The encryption key (K1), the token (TK) and one piece (P1) is stored on the service provider database and every other piece (P2 ... Pn) is stored on the different participant's databases on different locations along with the generated token (TK).

<u>The process to reconstruct the original sensitive data from the different pieces is described on the steps bellow:</u>

1) Every participant sends his piece and the token to the service provider. Using the token the service provider finds his piece and combine the elements

```
P2 and TK,       P3 and TK, ... , Pn and TK -- Combine all pieces plus P1--> [1][X][&][#][R]
^                ^                ^                                          ^
|                |                |                                          |
+- Participant 2 + Participant 3  + Pn - Participant N                       + ED - Encrypted Data
```

2) The encrypted data (ED) is decrypted with the key (K1) back to the sensitive data.

```
[A][1][X][&][$][R]  -- Decrypt (Ex: AES with key K1) --> [N][Y][C][C][N]
    ^                                                        ^
    |                                                        |
    +- ED - Encrypted Data                                   +- SD - Sensitive Data
```

After the original sensitive data is reconstructed the service provider can use the sensitive data in an operation (like a credit card purchase)

FIG. 4

METHOD FOR SECURING SENSITIVE DATA

CROSS-REFERENCE TO RELATED APPLICATION

This application is a continuation and claims the priority benefit of U.S. patent application Ser. No. 18/825,333 filed Sep. 5, 2024, which is a continuation and claims the priority benefit of U.S. patent application Ser. No. 14/341,776 filed Jul. 26, 2014, which claims the benefit of U.S. provisional patent application 61/930,433 filed Jan. 22, 2014. The disclosures of the aforementioned applications are incorporated herein by reference.

BACKGROUND AND SUMMARY OF THE INVENTION

This invention relates to the field of secure transactions, and in particular to a method and system that provides a high degree of security to sensitive information. The principles of this invention may be applied, for example, to any transaction or process (e.g. a payment transaction) that requires access to sensitive data of a third party (e.g. a customer).

The continually increasing use of on-line commercial transactions, remote banking applications, electronic funds transactions, and the like has resulted in the widespread distribution of sensitive information to a large number of databases. As the distribution of this information increases, the potential for unauthorized access to this information also increases. This sensitive information may include, for example, a person's username, password, account number, credit card number, PIN, CSC, and others, as well as such items as cookies and fingerprints, each of which may facilitate access to the person's financial and other records. In like manner, other sensitive information items, such as the person's social security number, address, and other personal information are stored in a variety of databases and are subject to potential unauthorized access.

One method of protecting the security of sensitive information is to assure that the sensitive information is not stored anywhere. However, such an approach would not allow for access to this sensitive information for recurring transactions, and would require the user to manually enter the sensitive information for each transaction. In addition to being inconvenient to the user, such repeated transmission of the sensitive information also increases the risk of exposing this information to unauthorized monitors of the communication channels used.

According to the nonprofit consumer organization Privacy Rights Clearinghouse, over 227 million individual records containing sensitive personal information were involved in security breaches in the United States between January 2005 and May 2008.

A number of protocols have been proposed and/or implemented to minimize the likelihood of unauthorized access to such sensitive information, thereby reducing the likelihood of unauthorized access to a user's financial resources. For example, to reduce the risk of unauthorized access to credit card information, the major credit card corporations developed the Payment Card Industry Data Security Standard (PCI DSS) in 2004. Other standards have also been developed for on-line banking transactions, using, for example, unique transaction identifiers and the like. For ease of illustration and understanding, the PCI-DSS is presented herein as a paradigm of a security standard that facilitates recovery of previously submitted sensitive information while minimizing the risk of exposing this sensitive information at the source of a financial transaction.

The Payment Card Industry Data Security Standard advises:

"Keep cardholder information storage to a minimum . . . . Do not store sensitive authentication data subsequent to authorization (not even if encrypted)" (www.visa.com/cisp). This recommendation makes it clear that it is always better to not store the information, regardless of the level of security, because there is always a risk of a security breach.

Often, however, a merchant must be able to re-use a customer's credit card information. In a restaurant, for example, the merchant swipes the customer credit card and receives confirmation that the card may be used for the indicated amount. Subsequently, after the card is returned to the customer, the customer may add a tip to the amount that is to be charged, and the merchant must submit this new total to be charged to the credit card. Retaining the customer's credit card information between these two transactions, however, is contrary to the aforementioned standard. In another example, a hotel may swipe a guest's credit card during the registration process, and allows the guest to charge purchases to the room, to extend their stay, and so on, without requiring the guest to re-submit the credit card information.

One technique for avoiding the need to retransmit the customer's credit card information is to assign a unique transaction identifier to the initial submission of the credit card information, and then use this transaction identifier to reference the ongoing transaction. This technique, however, only works for repeated transmission associated with the same transaction.

Often, however, it is often desirable to retain the user's sensitive information between individual transactions. On-line customers, for example, generally prefer merchants, such as Amazon, Netflix, and so on, that allow them to avoid re-entering their credit card information for subsequent purchases, each subsequent purchase being a different transaction. Similarly, customers using on-line banking service providers prefer providers that allow them to access to their accounts and effect transactions with a minimal repeat of previously submitted sensitive information.

In 2005, the concept of Tokenization was developed by J. D. Oder of Shift Corporation, enabling merchants to store "tokens" that can be used to reference customers'credit card information, without actually storing the credit card information. Tokenization is also often used by a financial service provider to enable clients to access their financial accounts at other institutions without having to re-enter previously submitted sensitive information, and without the service provider being required to store the clients'access information for these other institutions.

FIG. 1 illustrates an example flow diagram for the tokenization process, such as might occur during an on-line purchase, and subsequent shipment of a purchased product. For ease of reference and understanding, the term 'credit card information' is used herein to represent any sensitive information that is to be protected. Also for ease of understanding, only the flow of data having relevance to the tokenization process is illustrated in the figures; one of skill in the art will recognize that additional information regarding the transaction will be communicated, including, for example, an identification of the merchant, the amount of the transaction, and so on. One of skill in the art will also recognize that the communication of information among the parties of FIG. 1 will generally be secure communications, the details of which are common in the art and are not included in this description.

In FIG. 1, time is illustrated as flowing from left to right. The flow starts when a customer 10 submits credit card information 120 to a merchant 20. Associated with this credit card information is a transactionID 110 that identifies this particular transaction. The merchant 20 forwards the credit card information 120 to a payment company[1] 30 that interacts with the credit card company/operator 40.

[1] A payment company acts as an intermediary between multiple merchants and the credit card company/operator, so that the credit card operator does not need to interact with each of these merchants individually.

The payment company 30 executes the credit card transaction by sending the transaction information, including the credit card information 120, to the credit card operator 40. The payment company 30 also encrypts the credit card information 120 to create encrypted credit card information 130 and creates a unique token 140 that is mapped to this encrypted credit card information 130. The unique token 140 and the encrypted credit card information 130 are stored in a database 180 that is controlled by the payment company.

The credit card operator 40 communicates an authorization (not illustrated) to the payment company 30, indicating that the credit card will be charged when the transaction is finalized (e.g. when the purchased product is shipped).

In addition to storing the unique token 140 in database 180, the payment company 30 also communicates the token 140 to the merchant 20, typically as part of the aforementioned receipt/authorization for the transaction. Upon receipt of the token 140, the merchant 20 stores the transactionID 110 and the token 140 in a database 190 that is controlled by the merchant. This token 140 may be stored in encrypted form for additional security.

It is significant to note that the merchant's database 190 does not contain the credit card information 120, it merely contains a token 140 that is mapped to encrypted credit card information 130 at the payment company 30 and accessed via the transactionID 110, or some other identifier of the transaction at the merchant database 110.

When the merchant 20 ships the purchased product to the customer 10, The merchant 20 retrieves the token 140 associated with this transactionID 110 from the database 190, and submits the token 140 to the payment company 30 with a notification that the transaction has been finalized.

Upon receipt of the token 140, the payment company 30 retrieves the encrypted credit card information 130 from the database 180 and decrypts it via a decrypter 170, thereby re creating the customer's credit card information 120, which is then sent to the credit card operator 40 with instructions that the transaction has been finalized, and payment should be issued.

As noted above, throughout this process, the sensitive credit card information 120 is not stored at the merchant's database 190, although the token enables the merchant to reference this credit card information at the payment company 30.

This same principle of using a token to reference sensitive information can be used to enable a merchant 20 to store the personal information of the customer 10, and a token (typically randomly generated) corresponding to the customer's previously submitted credit card information. This stored token and other information related to the customer may be indexed, for example, by a customer ID or other unique identifier. When the customer 10 subsequently communicates with the merchant 20, the customer 10 has the option of merely submitting the unique identifier, to avoid having to re-enter information, such as the customer's address and the customer's credit card information 120. Upon receipt of the unique identifier, the merchant 20 may access the database 190 and retrieve the token 140 that is associated with this customer's encrypted credit card information 130 at the payment company 30. When a purchase is made, the merchant 20 submits the token 140 to the payment company 30 with other transaction information, as detailed above. Again, the customer's credit card information 120 is never stored at the merchant's database 190.

Although the flow illustrated in FIG. 1 eliminates the need to store the customer's credit card information 120 at the merchant's database 190, an encrypted form 130 of this credit card information 120 is stored at the database 180. A security breach of the key to the decrypter 170 could expose the credit card information 120 to unauthorized access. Because the payment company may be serving hundreds or thousands of merchants, such a security breach would likely result in thousands of credit card information records being exposed to unauthorized access.

It would be advantageous to enhance the protections provided by conventional tokenization systems. It would also be advantageous to enhance the protection of sensitive information by other security systems These advantages, and others, can be realized by avoiding the storage of any single information item that provides direct access to sensitive information. Preferably, to gain access to the sensitive information, information elements from at least two different databases must be provided, none of the information elements being sufficient to gain access to the sensitive information. In an example embodiment, a payment company encrypts the sensitive information, then partitions the encrypted information into at least two parts. These at least two parts are stored in at least two databases, each database being controlled by a different entity. To gain access to the sensitive information, each of the different entities must provide their part of the encrypted information. Absent any one of the parts of the encrypted information, it is virtually impossible to access the sensitive information.

In an example embodiment, the transaction system includes a first party (e.g. a payment company) that, during a first time interval: receives sensitive information from a second party (e.g. a merchant), encrypts the sensitive information to form an encryption of the sensitive information, partitions the encryption into at least a first piece and a second piece, stores the first piece in a first database, and sends the second piece to the second party for storage in a second database. During a second time interval, the first party: receives the second piece from the second party, retrieves the first piece from the first database, combines the first piece and the second piece to re-create the encryption, and decrypts the encryption to re-create the sensitive information. The transaction system also includes a third party (e.g. the customer) that provides the sensitive information to the second party.

BRIEF DESCRIPTION OF THE DRAWINGS

The invention is explained in further detail, and by way of example, with reference to the accompanying drawings wherein:

FIG. 4 illustrates exemplary processes for splitting encrypted sensitive data in pieces and reconstructing the sensitive data from the pieces.

Throughout the drawings, the same reference numerals indicate similar or corresponding features or functions. The drawings are included for illustrative purposes and are not intended to limit the scope of the invention.

DETAILED DESCRIPTION

In the following description, for purposes of explanation rather than limitation, specific details are set forth such as the particular architecture, interfaces, techniques, etc., in order to provide a thorough understanding of the concepts of the invention. However, it will be apparent to those skilled in the art that the present invention may be practiced in other embodiments, which depart from these specific details. In like manner, the text of this description is directed to the example embodiments as illustrated in the Figures, and is not intended to limit the claimed invention beyond the limits expressly included in the claims. For purposes of simplicity and clarity, detailed descriptions of well-known devices, circuits, and methods are omitted so as not to obscure the description of the present invention with unnecessary detail.

As noted above, in this disclosure, the Payment Card Industry Data Security Standard is used as an example application that uses a tokenization system. One of skill in the art will recognize, in view of this disclosure, that this invention is not limited to an embodiment for any particular application, and may be used in any application that requires a secure method of protecting previously submitted sensitive information.

As in the above example of a conventional tokenization system, details regarding transaction information that are not directly related to the protection of sensitive information are omitted from this description and accompanying figures. In like manner, details regarding the security provided for communications between entities is also omitted, for each of illustration and understanding of the principles of this invention.

Figure 1:
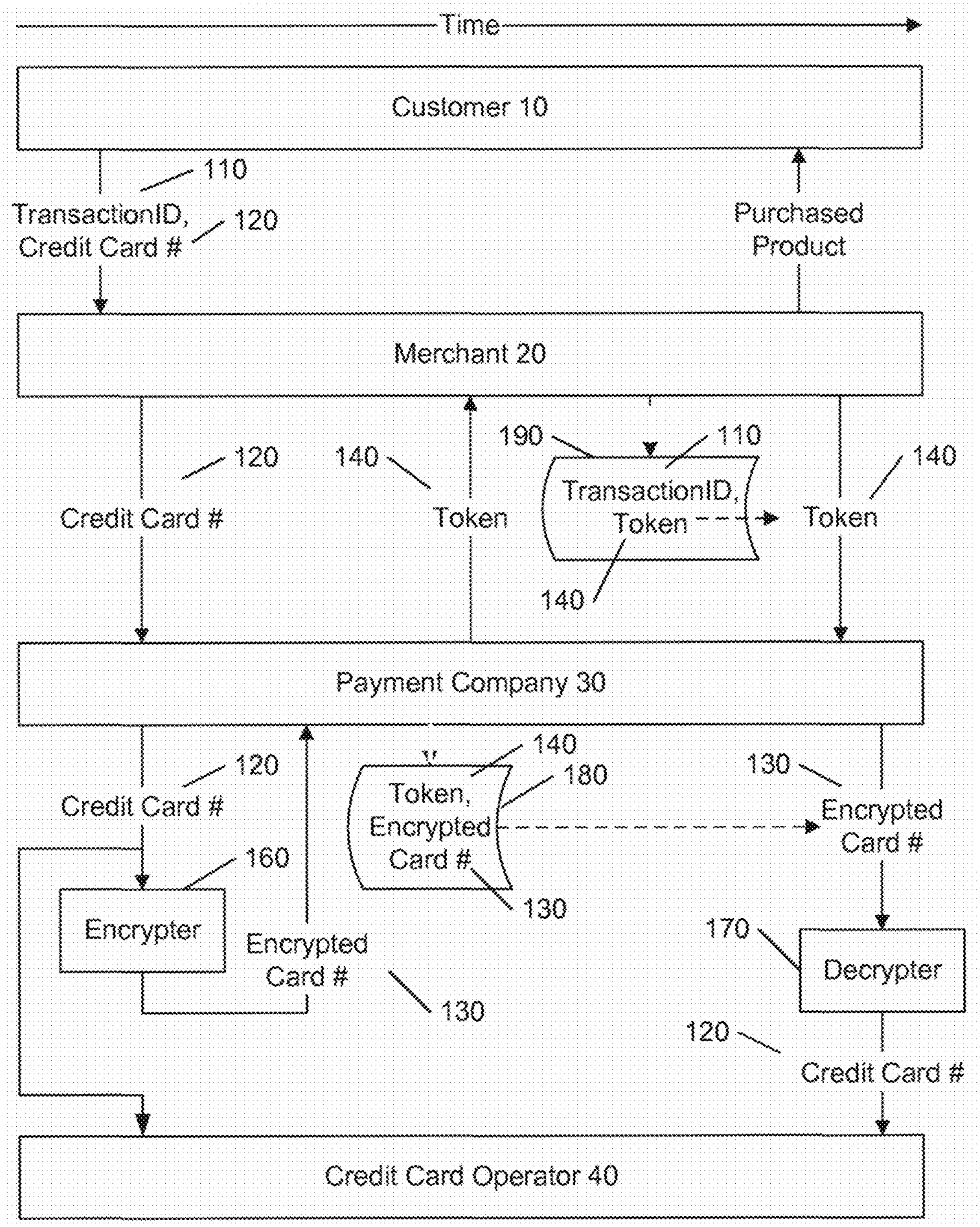
FIG. 1 [Prior Art]
FIG. 1 illustrates an example flow diagram of a conventional tokenization transaction system.
Figure 2:
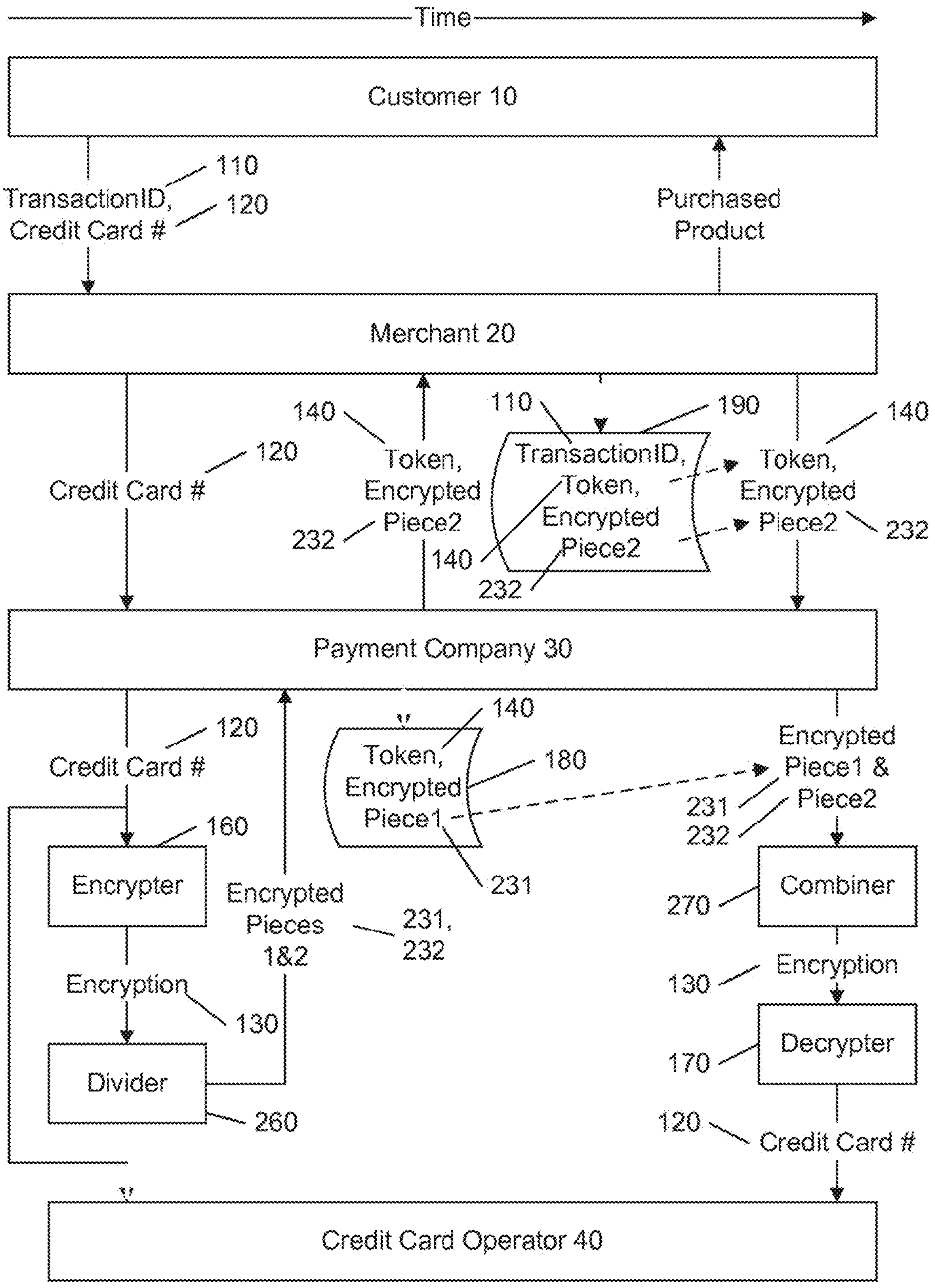
FIG. 2 illustrates an example flow diagram of a tokenization transaction system that provides two-part storage of encrypted sensitive information.

As in FIG. 1, time is illustrated in FIG. 2 as progressing from left to right. The elements of FIG. 2 that substantially correspond to the elements of FIG. 1 are referenced by the same reference numerals.

The customer 10 initially submits credit card information 120 that is associated with a transactionID 110 to the merchant 20. As detailed above, the term 'credit card information' is used herein to reference any sensitive information that is to be protected, and may include, for example, a credit card account number, a debit card account number, a bank account number, a social security account number, a health account number, and the like. The transactionID 110 is any reference item with which the particular transaction may be identified; typically, it is created by the merchant 20 and used for subsequent actions with regard to this transaction, as detailed below.

The merchant 20 forwards the credit card information 120 to the payment company 30, as an intermediary between the merchant 20 and the credit card operator 40. The payment company 30 forwards the credit card information 120 to the credit card operator 40 to initiate the execution of this transaction using the credit card information 120. The payment company 30 also encrypts the credit card information 120 to produce an encryption 130 of the credit card information 120.

As contrast with FIG. 1, a divider 260 is configured to partition the encryption 130 into two pieces 231, 232. The partitioning may take any form, provided that neither piece 231, 232 is sufficient to produce the credit card information 120 by decryption or other means. For example, the encryption may be divided in half, and the first n/2 bits of the encryption forms piece 231, with the remainder forming piece 232; in another example, the first piece 231 contains the odd bits of the encryption while piece 232 contains the even bits. The pieces 231, 232 need not be of the same size.

The payment company 30 also creates a unique token 140 that is used to reference the encryption 130. However, as contrast to the conventional system of FIG. 1, the payment company stores the token and only one piece 231 of the encryption 130 in the database 180 that is controlled by the payment company 30.

The payment company 30 sends the other piece 232 of the encryption 130 to the merchant 20, along with the token 140. The merchant stores the token 140 and the second encrypted piece 232 in its database 190, referenced to the transactionID 110. Optionally, not illustrated, the token 140 and this encrypted piece 232 may be further encrypted by the merchant before storage in the database 190 for added security.

As in the system of FIG. 1, the merchant 20 does not store an information item that can be used to directly obtain the credit card information 120, and thus is in compliance with the Payment Card Industry Data Security Standard (PCI DSS).

When the merchant 20 completes the transaction by shipping the purchased product, the merchant 20 uses the transactionID 110 to retrieve the token 140 and the piece 232 of the encryption 130 from the database 190. If the merchant had encrypted the token 140 and/or the piece 232, they are decrypted to provide the token 140 and piece 232. The merchant 20 sends the token 140 and the piece 232 to the payment company 30 with a notification that the transaction is to be finalized.

The payment company 30 uses the token 140 to retrieve the piece 231 of the encryption 130, and combines this piece 231 with the received piece 232 from the merchant 20, via a combiner 270 to form the encryption 130. This encryption 130 is decrypted 170 to provide the original credit card information 120, which is sent to the credit card operator 40 for executing the transaction based on this credit card information 120.

It is significant to note that neither the database 180 nor the database 190 contains sufficient information to gain access to the credit card information 120 even if the key to the decrypter 170 is compromised. An unauthorized user would need to broach the security of the merchant's database 190 and the payment company's database 180, as well as obtaining the key to the decrypter 170 in order to gain access to the credit card information 120.

The security of the transaction system detailed above may be further enhanced by further partitioning the encryption 130 and storing the additional pieces 231, 232, 233, etc. at other locations.

Figure 3A:
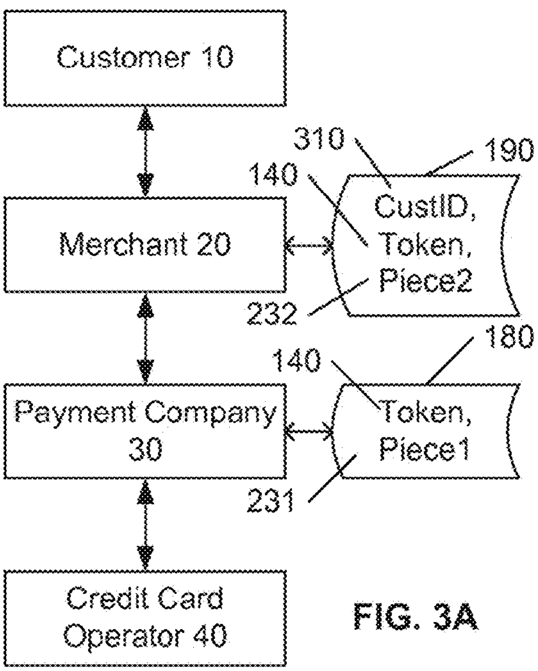
FIGS. 3A-3C illustrate an example transaction systems that provide two, three, and four part storage of encrypted sensitive information.

FIG. 3A illustrates an example transaction system wherein a customer ID 310 is used by the merchant 20 for referencing personal information of the customer 10, including a token 140 that is associated with the customer's previously submitted credit card information. This previously submitted credit card number is not illustrated in FIG. 3A, because this information is not stored even in encrypted form, per se, in the transaction systems of this invention. Instead, individual pieces 231, 232 of an encrypted form of the credit card information are stored in the database 180 at the payment company 30 and the database 190 at the merchant 20, as detailed above with respect to the data flow illustrated in FIG. 2.

When the customer provides a customer ID 310 to the merchant 20 during a transaction, the merchant 20 uses this customer ID 310 to retrieve the token 140 and piece2 232 of the encrypted form of the credit card information from its database 180. The merchant 20 forwards the token 140 and piece2 232 to the payment company 30. The payment company 30 uses the token 140 to retrieve piece1 231 from its database 190, combines piece1 231 and piece2 232 to reproduce the encrypted form of the credit card information.

The credit card company 30 decrypts the credit card information and submits it to the credit card operator 40 to initiate the credit card transaction. Note that neither the credit card information nor the encrypted form of the credit card information is stored in any of the databases 180, 190.

Figure 3B:
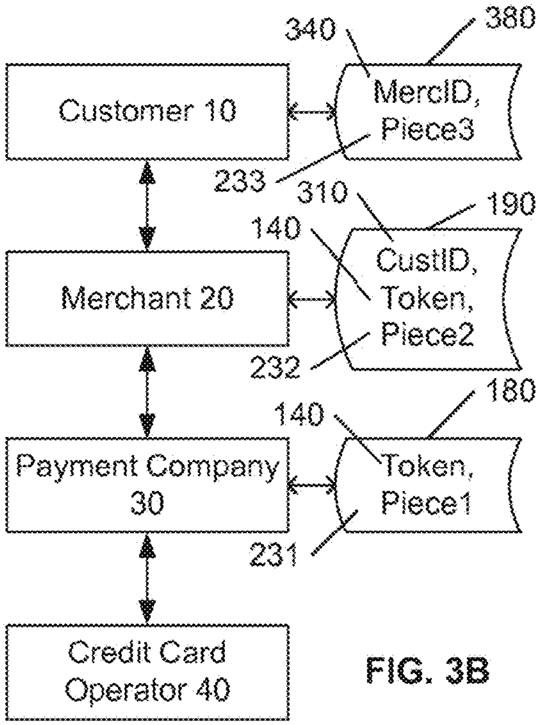

FIG. 3B illustrates an example embodiment wherein the encrypted credit card information is partitioned into three pieces 231, 232, 233 that are each stored in different databases 180, 190, 380, respectively. In order to decrypt the credit card information, a combination of piece1 231, piece2 232, and piece3 233 must be formed, corresponding to the original encryption of the credit card information of the customer 110 for use with this merchant 30.

In an example embodiment, the payment company 30 may partition the encryption into two pieces and send one of the pieces to the merchant 20, as in FIGS. 2 and 3A. In this manner, the payment company 30 provides a consistent response, independent of the number of pieces that will be stored at different databases. The merchant 20 may partition the received piece into two pieces 232,233, and send one of the pieces 233 to the customer 10. The customer 10 may, for example, have an "app" on a smart phone that is associated with this merchant, which stores the piece 233, or the customer 10 may have an "add-on" to a browser that is able to store the piece 233 in a database 380, indexed by an identifier 310 of the merchant 20. Other techniques for storing the piece 233 may be used, preferably in a manner that does not require the customer's interaction for storing and retrieving the piece 233.

When the customer 10 subsequently initiates a transaction with the merchant 20, the customer provides its customer ID 310 and the piece 233 that it had received from the merchant 20. As noted above, an app on the customer's device may automatically send the piece 233 when contact is re-initiated with the merchant 20. The merchant 20 uses the customer ID 310 to access the token 140 and the piece 232 that it had retained when it sent the piece 233 to the customer 10. The merchant combines this piece 232 with the received piece 233 and sends the combination to the payment company 30.

The payment company 30 combines its piece 231 to the received combination to form the original encryption of the customer's credit card information. The payment company 30 decrypts the original encryption to retrieve the customer's credit card information, and uses this credit card information to initiate the transaction with the credit card operator 40. The payment company 30 may also create another token to identify this particular transaction, as detailed above with respect to FIG. 2.

Figure 3C:
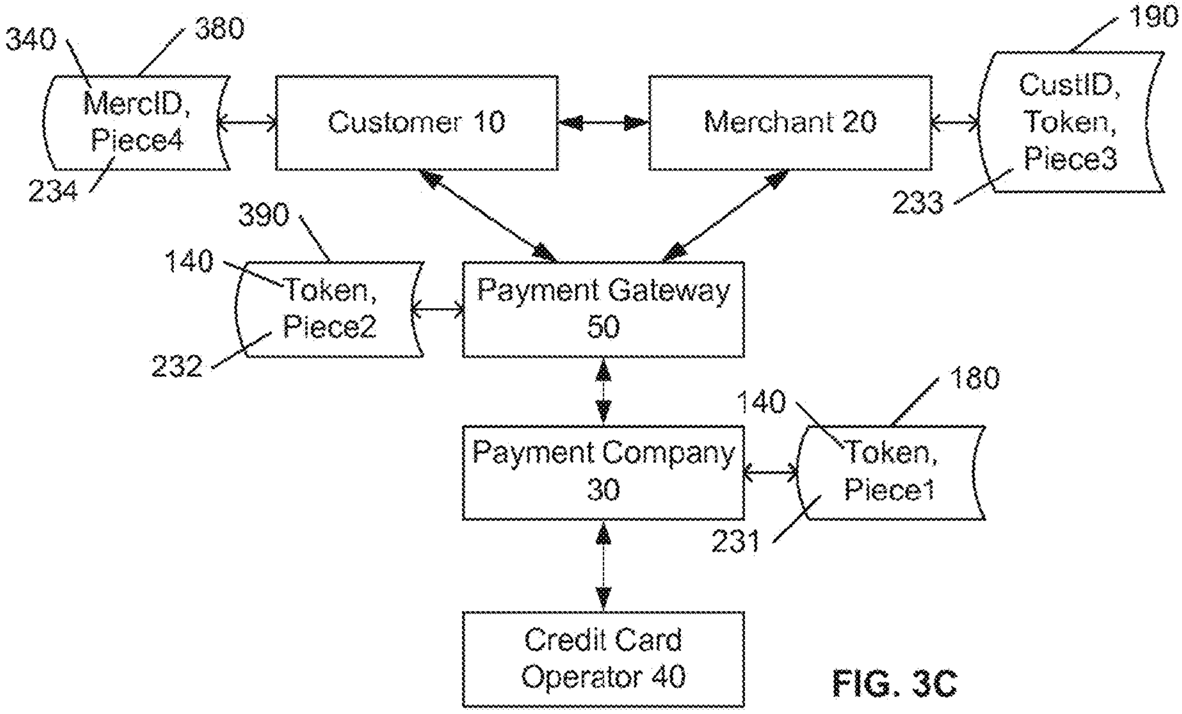

FIG. 3C illustrates an example embodiment that partitions the encryption into four pieces 231,232,233,234, and stores each piece in a different database 180,390,190,380, respectively.

In this embodiment, a payment gateway 50 provides an interface to the payment company 30 for the merchant 20 and customer 10. In some embodiments the payment gateway 50 may receive the credit card information directly from the customer 10, thereby avoiding having this information accessible by the merchant 20.

The payment gateway 50 may receive a piece of the encryption from the payment company 30, partition it into three pieces 232, 233, 234, and send the pieces 233 and 234 to the merchant 20 and the customer 10, respectively. Alternatively, the gateway 50 may partition the received piece into two pieces, and send one of the pieces to the merchant 20, who subsequently partitions the received piece into two pieces 233,234 and sends one of the pieces 234 to the customer 10.

One of skill in the art will recognize that other schemes may be used to partition the encryption and distribute the pieces. For example, in FIG. 3C, the customer 10 may not receive a piece of the encryption, or the merchant 20 may not receive a piece, or the payment gateway 50 may not receive a piece, or the payment company 30 may not retain a piece. Any of these options may be used, provided however that at least two of the parties obtain a different piece of the encryption.

FIG. 4 illustrates exemplary processes for splitting encrypted sensitive data in pieces and reconstructing the sensitive data from the pieces.

Encrypted data may be split into 2 parts for credit card data storage for future charges on a payment company. In this scenario, first the credit card data (sensitive data) is sent by the merchant to the payment company. 1) The payment company using the method described above encrypts the data and split it in two parts. 2) Then it stores one part on his database and returns the token and the other part to the merchant. 3) The merchant stores the token and his part on his database linking the data with the credit card owner. Later, when the credit card owner wants to make a purchase using the same credit card: 1) The merchant calls the payment company charge API sending his token and his part with all the other information necessary to make the payment (like amount and description). 2) The payment company retrieves his part on the database using the token. 3) The payment company joins both parts and decrypts it getting the credit card data. 4) The payment company charges the credit card with the requested amount.

Encrypted data may be split into 3 parts for credit card data storage for future charges on a payment company using a payment gateway. In this scenario, first the credit card data (sensitive data) is sent by the merchant to the payment gateway. 1) The payment gateway sends the credit card data to the payment company. 2) The payment company using the method described above encrypts the data and split it in three parts. 3) Then it stores one part on his database and returns the token and the other parts to the payment gateway. 4) The payment gateway stores his part and the token on the database and returns the token and the other part to the merchant. 5) The merchant stores the token and his part on his database linking the data with the credit card owner. Later, when the credit card owner wants to make a purchase using the same credit card: 1) The merchant calls the payment gateway charge API sending his token and his part with all the other information necessary to make the payment (like amount and description). 2) The payment gateway retrieves his part on the database using the token. 3) The payment gateway sends his and merchant parts to the payment company. 4) The payment company retrieves his part on the database using the token. 5) The payment company joins both parts and decrypts it getting the credit card data. 6) The payment company charges the credit card with the requested amount.

Encrypted data may be split into 4 parts for credit card data storage for future charges on a payment company using a payment gateway storing one part on the customer device (browser or mobile). In this scenario first the credit card data (sensitive data) is sent by the merchant to the payment gateway. 1) The payment gateway sends the credit card data to the payment company. 2) The payment company using the method described above encrypts the data and split it in four parts. 3) Then it stores one part on his database and returns the token and the other parts to the payment gateway. 4) The payment gateway stores his part and the token on the database and returns the token and the other parts to the merchant. 5) The merchant stores the token and his part on his database linking the data with the credit card owner. 6) The merchant stores the customer part and token on the customer device using TavaScript (browser) or another code execution method (mobile) Later when the credit card owner wants to make a purchase using the same credit card on the device: 1) The merchant retrieves the customer token on the device using JavaScript (browser) or another code execution method (mobile) 2) The merchant calls the payment gateway charge API sending the token and his and customer parts with all the other information necessary to make the payment (like amount and description). 3) The payment gateway retrieves his part on the database using the token. 4) The payment gateway sends his, the customer and merchant parts to the payment company. 5) The payment company retrieves his part on the database using the token. 6) The payment company joins both parts and decrypts it getting the credit card data. 7) The payment company charges the credit card with the requested amount.

The foregoing merely illustrates the principles of the invention. It will thus be appreciated that those skilled in the art will be able to devise various arrangements which, although not explicitly described or shown herein, embody the principles of the invention and are thus within its spirit and scope. For example, as noted above, the invention has been presented in the context of a conventional credit card transaction system, but it may also be embodied in other transaction systems, such as bank transfers and the like. In like manner, the transaction system may have multiple generators of tokens, at different levels of the transaction hierarchy. In the example of FIG. 3C, for example, the payment gateway 50 may generate its own tokens as it deals with the merchant 20 and customer 10, and these tokens may be used to reference tokens that the payment gateway 50 receives from the payment company 30. These and other system configuration and optimization features will be evident to one of ordinary skill in the art in view of this disclosure, and are included within the scope of the following claims.

In interpreting these claims, it should be understood that:

a) the word "comprising" does not exclude the presence of other elements or acts than those listed in a given claim;

b) the word "a" or "an" preceding an element does not exclude the presence of a plurality of such elements;

c) any reference signs in the claims do not limit their scope;

d) several "means" may be represented by the same item or hardware or software implemented structure or function;

e) each of the disclosed elements may be comprised of a combination of hardware portions (e.g., including discrete and integrated electronic circuitry) and software portions (e.g., computer programming).

f) hardware portions may include a processor, and software portions may be stored on a non-transitory computer-readable medium, and may be configured to cause the processor to perform some or all of the functions of one or more of the disclosed elements;

g) hardware portions may be comprised of one or both of analog and digital portions;

h) any of the disclosed devices or portions thereof may be combined together or separated into further portions unless specifically stated otherwise;

i) no specific sequence of acts is intended to be required unless specifically indicated; and j) the term "plurality of" an element includes two or more of the claimed element, and does not imply any particular range of number of elements; that is, a plurality of elements can be as few as two elements, and can include an immeasurable number of elements.

What is claimed is:

1. A method for reproducing partitioned datasets, the method comprising:

receiving a dataset of sensitive information associated with a client, the sensitive information sent over a communication network and received by a gateway system;

sending the dataset from the gateway system to a first party system;

encrypting the dataset at the first party system, wherein the encrypted dataset is partitioned into a first encrypted part, a second encrypted part, and a third encrypted part, each encrypted part associated with a same unique token, and wherein the first encrypted part is stored at the first party system;

transmitting the unique token, the second encrypted part, and the third encrypted part from the first party system to the gateway system, wherein the second encrypted part is stored at the gateway system;

transmitting the unique token and the third encrypted part from the gateway system to a second party system, wherein the third encrypted part is stored in the second party system;

partitions the third encrypted part into a first encrypted piece and a second encrypted piece, executes code at a client device and trigger storage of the first encrypted piece at an application installed on the client device, sending the unique token and the third encrypted part from the second party system to the gateway system upon receiving a request to use the encrypted dataset in an online transaction involving the second party system and the client device of the client;

sending the unique token, the second encrypted part, and the third encrypted part from the gateway system to the first party system, wherein the second encrypted part is retrieved by the gateway system using the unique token;

combining the first encrypted part, the second encrypted part, and the third encrypted part into a reproduced encrypted dataset at the first party system, wherein the first encrypted part is retrieved by the first party system using the unique token; and decrypting, by the first party system, the reproduced encrypted dataset.

2. The method of claim 1, further comprising receiving the first encrypted piece directly from the client device at the gateway system, wherein receiving the encrypted dataset directly from the client device avoids access by the second party system.

3. The method of claim 1, wherein the first encrypted piece is provided from the client device by an application installed on the client device.

4. The method of claim 3, wherein the application is in wireless communication with the second party system.

5. The method of claim 4, wherein the application is executable to automatically provide the first encrypted piece from the client device when contact associated with the online transaction is initiated with the second party system.

6. The method of claim 3, wherein the application is an extension on a browser on the client device.

7. The method of claim 1, wherein the second party system retrieves the token based on a customer identifier (ID) associated with the client device.

8. The method of claim 1, further comprising:

generating a gateway token that references the unique token received from the first party system;

storing the gateway token and the retrieved encrypted part in a database associated with the gateway system; and retrieving the encrypted part based on the gateway token.

9. A system for reproducing partitioned datasets, the system comprising:

a gateway system comprising: a gateway system processor and a gateway system memory storing gateway system instructions that when executed by the gateway system processor perform operations that:

receives a dataset of sensitive information associated with a client, the sensitive information sent over a communication network;

a first party system comprising: a first party system processor and a first party system memory storing first party system instructions that when executed by the first party system processor perform operations that:

receives the dataset from the gateway system, encrypts the dataset, partitions the encrypted dataset into a first encrypted part, a second encrypted part, and a third encrypted part each associated with a same unique token, stores the first encrypted part in memory of the first party system, and transmits the unique token, the second encrypted part, and the third encrypted part to the gateway system, wherein the second encrypted part is stored in the gateway system; and a second party system comprising: a second party system processor and a second party system memory storing second party system instructions that when executed by the second party system processor perform operations that:

receives the unique token and the third encrypted part from the gateway system, partitions the third encrypted part into a first encrypted piece and a second encrypted piece, executes code at a client device and trigger storage of the first encrypted piece at an application installed on the client device, stores the third encrypted part in memory of the second party system, and sends the unique token and the third encrypted part to the gateway system upon receiving a request to use the encrypted dataset on an online transaction involving the second party system and the client device of the client;

wherein the gateway system further:

retrieves the second encrypted part using the unique token, and sends the unique token, the second encrypted part, and the third encrypted part from the gateway system to the first party system; and wherein the first party system:

retrieves the first encrypted part using the unique token, combines the first encrypted part, the second encrypted part, and the third encrypted part into a reproduced encrypted dataset, and decrypts the reproduced encrypted dataset.

10. The system of claim 9, wherein the gateway system receives the first encrypted piece directly from the client device, wherein receiving the encrypted dataset directly from the client device avoids access by the second party system.

11. The system of claim 9, wherein the first encrypted piece is provided from the client device by an application installed on the client device.

12. The system of claim 11, wherein the application is in wireless communication with the second party system.

13. The system of claim 12, wherein the application is executable to automatically provide the first encrypted piece from the client device when contact associated with the online transaction initiated with the second party system.

14. The system of claim 12, wherein the application is an extension on a browser on the client device.

15. The system of claim 9, wherein the second party system retrieves the token based on a customer identifier (ID) associated with the client device.

16. The system of claim 9, wherein the gateway system further:

generates a gateway token that references the unique token received from the first party system;

stores the gateway token and the retrieved encrypted part in a database associated with the gateway system, and retrieves the encrypted part based on the gateway token.

17. A system comprising a first party non-transitory, computer-readable storage medium, having embodied thereon a first party program executable by a first party processor to perform a method for reproducing partitioned datasets, the method comprising:

receiving a dataset from a gateway system;

encrypting the dataset, wherein the encrypted dataset is partitioned into a first encrypted part, a second encrypted part, and a third encrypted part, each encrypted part associated with a same unique token, and wherein the first encrypted part is stored at the first party system;

transmitting the unique token, the second encrypted part, and the third encrypted part from the first party system to the gateway system, wherein the second encrypted part is stored at the gateway system;

the system further including a second party non-transitory computer-readable storage medium comprising second party instructions, that when read by a second party processor cause the second party processor to perform operations comprising:

receiving the unique token and the third encrypted part from the gateway system;

partitions the third encrypted part into a first encrypted piece and a second encrypted piece;

executes code at a client device and trigger storage of the first encrypted piece at an application installed on the client device;

wherein the third encrypted part is stored in the second party system;

sending the unique token and the third encrypted part from the second party system to the gateway system upon receiving a request to use the encrypted dataset in an online transaction involving the second party system and the client device of the client;

the system further including the gateway system comprising a gateway system non-transitory computer-readable storage medium comprising gateway system instructions, that when read by a gateway system processor cause the gateway system processor to perform operations comprising:

sending the unique token, the second encrypted part, and the third encrypted part from the gateway system to the first party system, wherein the second encrypted part is retrieved by the gateway system using the unique token wherein the first party processor further perform:

combining the first encrypted part, the second encrypted part, and the third encrypted part into a reproduced encrypted dataset, wherein the first encrypted part is retrieved by the first party system using the unique token; and decrypting the reproduced encrypted dataset.

* * * * *